Patented Dec. 24, 1929

1,740,549

UNITED STATES PATENT OFFICE

RALPH H. McKEE, OF LEONIA, NEW JERSEY, ASSIGNOR TO SOUTHERN ELECTRO-CHEMICAL COMPANY, OF NEW YORK, N. Y., A CORPORATION OF NEW JERSEY

NITRIC-ACID CONCENTRATION

No Drawing. Application filed August 22, 1925. Serial No. 51,747.

This invention is an improvement in processes of concentrating nitric acid, and more particularly in a process for concentrating acids containing organic matter, such for instance as nitro-glycerine waste acids.

In the patent to Pauling No. 1,031,864 a process of concentrating nitric acid is set forth, wherein the acid with a suitable proportion of a dehydrating agent, such as sulphuric acid, is passed counter to a current of steam, or to a current of inert gases mixed with a large proportion of steam, over a laterally restricted path, sufficiently long to insure the delivery at the outlet of vapors of highly concentrated nitric acid.

The laterally restricted path is usually constituted by a column of sufficient height, the mixed acids flowing into the top of the column, while the steam or gases consisting largely of steam is or are introduced at the bottom. The rate of delivery of the gaseous medium, steam or steam laden gases, is regulated, and the column is of a height such that nitric acid vapors of a high degree of concentration are delivered at the outlet.

The highest temperature is of course at the inlet of the hot gaseous medium, or just above this inlet, and the lowest temperature is at the inlet of the acids. The sulphuric acid remains in the liquid state, and because of its affinity for water, practically all of the steam is taken up. With a path sufficiently long, in the presence of the sulphuric acid, the steam or vapor is condensed, leaving however the nitric acid in the gaseous state, and this concentrated nitric acid vapor may be conducted away substantially free from steam, but diluted with any oxids of nitrogen which may be present.

The process however does not work well with waste acids, which in the operation evolve large quantities of oxids of nitrogen as do certain nitro-glycerine waste acids. A primary object of the present invention is the provision of a process, largely like that of Pauling which has just been described, but especially adapted for the treatment of acids containing organic matter in considerable quantities, that is waste acids, evolving during treatment, large quantities of nitrogenous products.

With this object in view, I carry out the operation with conditions of temperature of the inflowing acids and the outflowing or exit gases, such that said gases are discharged at a temperature which will not exceed 185° F. and the conditions as to relative temperature I vary in accordance with the organic matter content through a range of approximately 80° F. with the temperature increase inverse to the increase of organic matter content. That is for optimum operation, the higher the percent of organic matter present, the lower will be the temperature at the discharge for the gases at the top of the towers, and the lower the organic matter content, and the higher the percent of nitric acid, the higher will be the temperature at this discharge point. Exact temperature limits cannot be specified, since as before stated the temperature is regulated in accordance with the amount of organic matter and nitric acid present.

A longer path than that preferred in the treatment of acid substantially free from impurities such as organic matter, is advisable in the treatment of acids of the character in question. A height of tower which should give good results is one of twenty diameters. That is a tower with the ordinary size of tower filling and with a diameter of two feet, should have a height of about 40 feet, to obtain nitric acid of approximately 97% strength.

It is advisable to return to the circulation, that is to the tower, the nitric oxids, which after passing the nitric acid condenser pass into the hypo-nitrite towers, and are there condensed to dilute nitric acid of say 35% strength. In my preferred procedure, the nitric acid of 35% strength from the hypo-nitrite towers is mixed with the incoming nitro-glycerine waste acids fed to the tower. Such a procedure permits practically all of the nitric acid content of the waste acid to be obtained as 95% strength acid or stronger.

The improved process being particularly designed for use with nitric acid containing organic matter in considerable quantities, the exact details of the operation will depend upon the content of the acid. When the content is high, the relative temperature of acids and gases is so regulated that the temperature of the discharged gases will vary from 95° F. to 175° F., in inverse relation to the organic matter content. This regulation may be obtained, for instance, by varying the relative feed of the nitric acid and the steam. When the organic matter content of the acid is low, the feed of acid will be lessened with respect to the feed of steam, and conversely when the organic matter content is high.

I claim:

1. The process of concentrating nitric acid containing organic matter, which consists in passing a mixture including the nitric acid and organic matter, water, and sulphuric acid counter to a current of steam, over a relatively long path, with conditions of temperature of the inflowing acids and the outflowing or exit gases, such that said gases are discharged at a temperature between about 105° F. and 175° F.

2. The process of concentrating nitric acid containing organic matter, which consists in passing a mixture containing the nitric acid with organic matter, water, and a liquid dehydrating agent, counter to a current of a hot gaseous medium, composed largely of steam over a relatively long path, and with a relative rate of feed of the cold acids and the hot steam, such that the temperature of the exit gases will range between 95° F. and 175° F., in inverse relation to the organic matter content of the acid, successively subjecting the nitric acid vapors to condensation, the accompanying oxids of nitrogen to absorbtion in the hyponitrite towers, and returning the acid from the hyponitrite towers to the circulation, by mixing it with the acid fed to the concentration tower.

3. The process of concentrating nitric acid containing organic matter, which consists in passing a mixture containing the nitric acid with organic matter, water, and a liquid dehydrating agent, counter to a current of a hot gaseous medium, composed largely of steam, over a relatively long path, and with a relative rate of feed of the cold acids and the hot steam, such that the temperature of the exit gases will range between 95° F. and 175° F., in inverse relation to the organic matter content of the acid.

Signed at New York city, in the county of New York and State of New York, this 19th day of August A. D., 1925.

RALPH H. McKEE.